Mar. 13, 1923.
N. W. HARTMAN
BLOCK MOLDING MACHINE
Filed Apr. 25, 1921
1,447,978
4 sheets-sheet 3
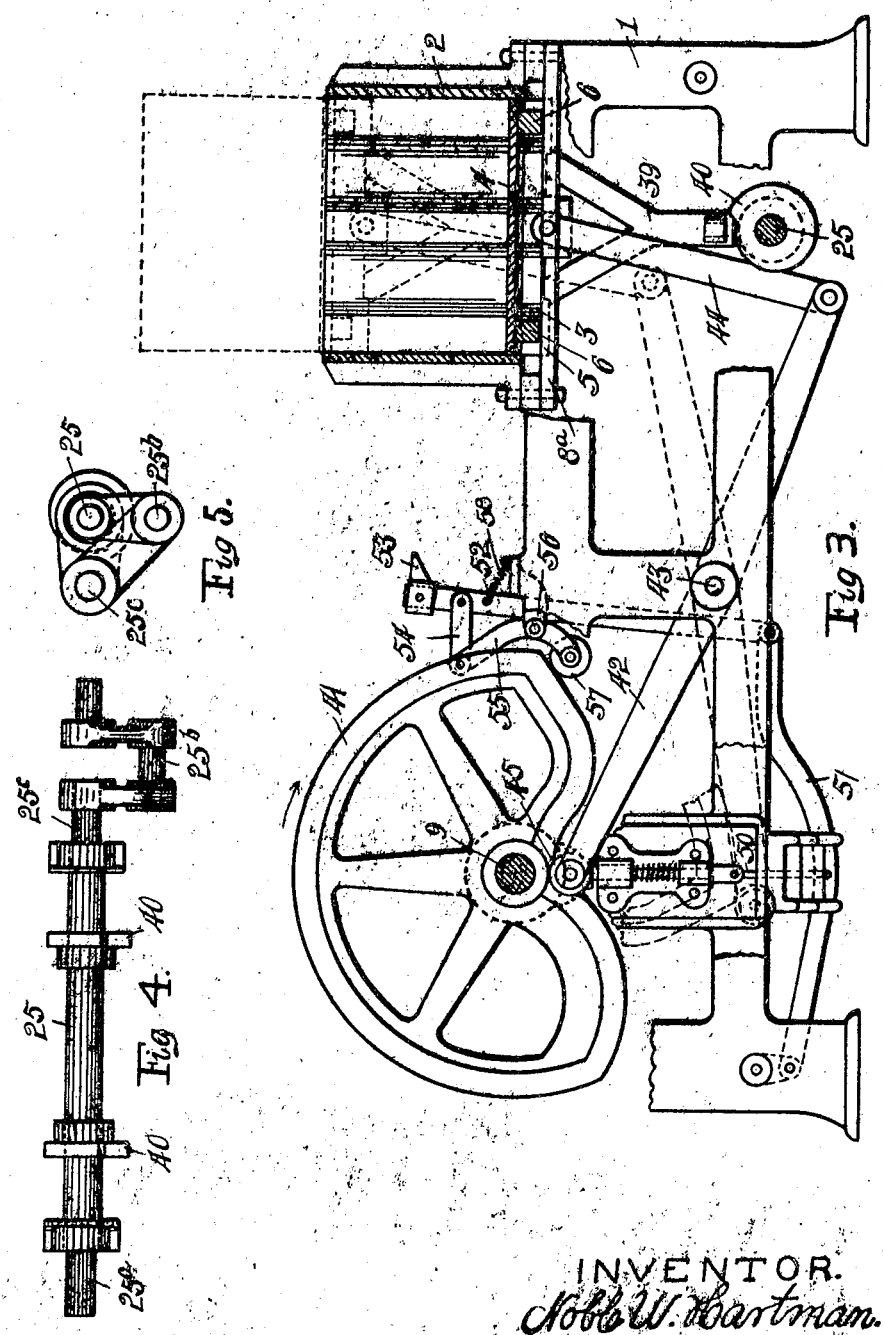
INVENTOR.
Nobb W. Hartman.

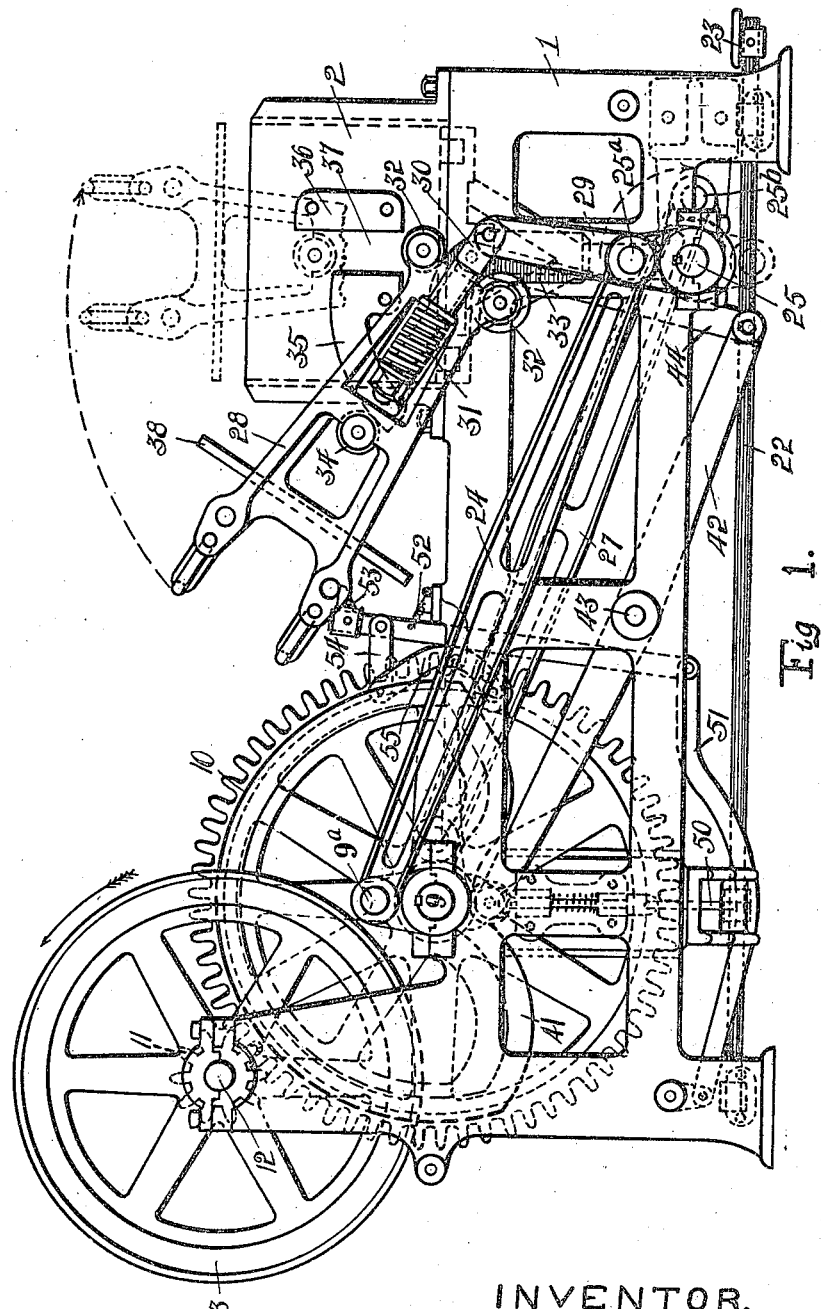

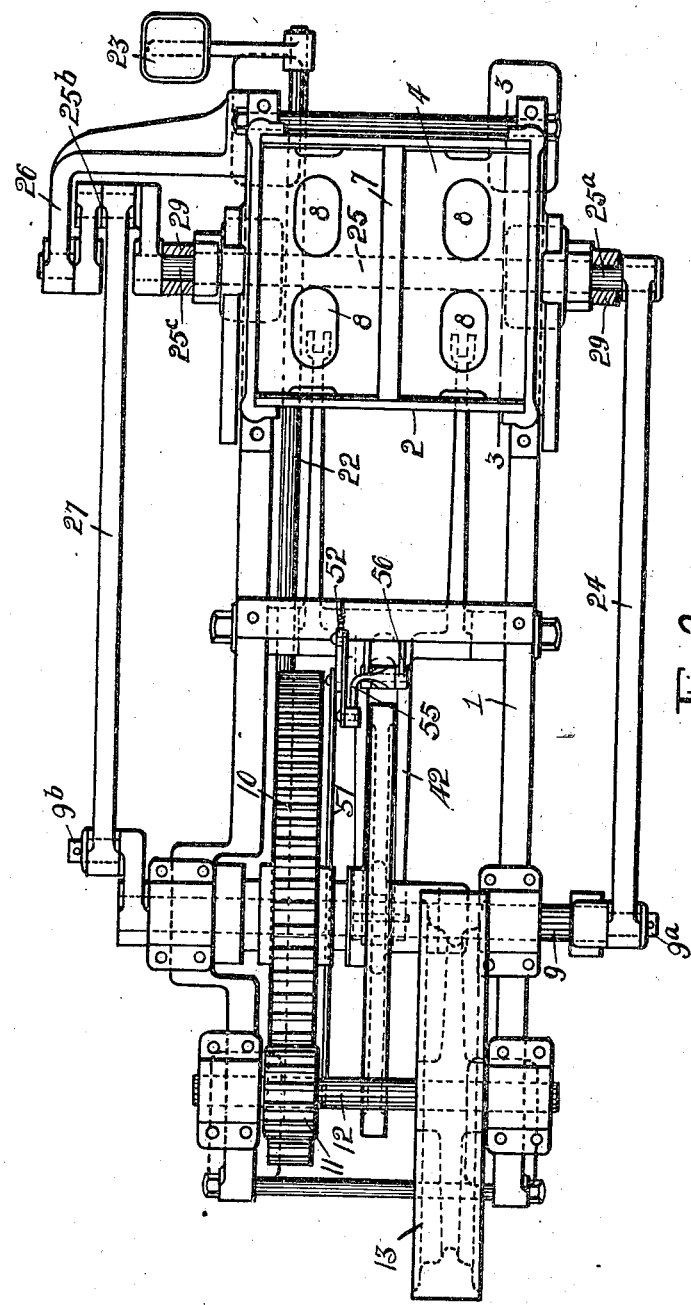

Mar. 13, 1923.

N. W. HARTMAN

BLOCK MOLDING MACHINE

Filed Apr. 25, 1921

1,447,978

4 sheets-sheet 4

INVENTOR.
Noble W Hartman.

Patented Mar. 13, 1923.

1,447,978

UNITED STATES PATENT OFFICE.

NOBLE W. HARTMAN, OF TOLEDO, OHIO, ASSIGNOR TO THE MULTIPLEX CONCRETE MACHINERY COMPANY, OF ELMORE, OHIO, A CORPORATION OF OHIO.

BLOCK-MOLDING MACHINE.

Application filed April 25, 1921. Serial No. 464,152.

*To all whom it may concern:*

Be it known that I, NOBLE W. HARTMAN, a citizen of the United States, and a resident of Toledo, in the county of Lucas and State of Ohio, have made an Invention Appertaining to Block-Molding Machines; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to machines of the class employed for making building blocks of concrete and other plastic material.

An object of my invention is the provision of a new machine of this character which is semi-automatic in its operation and adapted to mold concrete blocks and then eject them from the machine in a rapid and efficient manner.

The invention is fully described in the following specification, and while, in its broader aspect, it is capable of embodiment in numerous forms, a preferred embodiment thereof is illustrated in the accompanying drawings, in which,—

Figure 8:
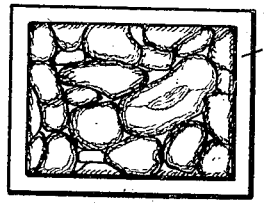
Figure 7:
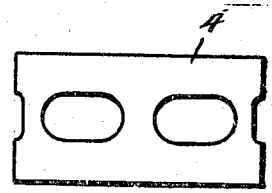
Figure 6:
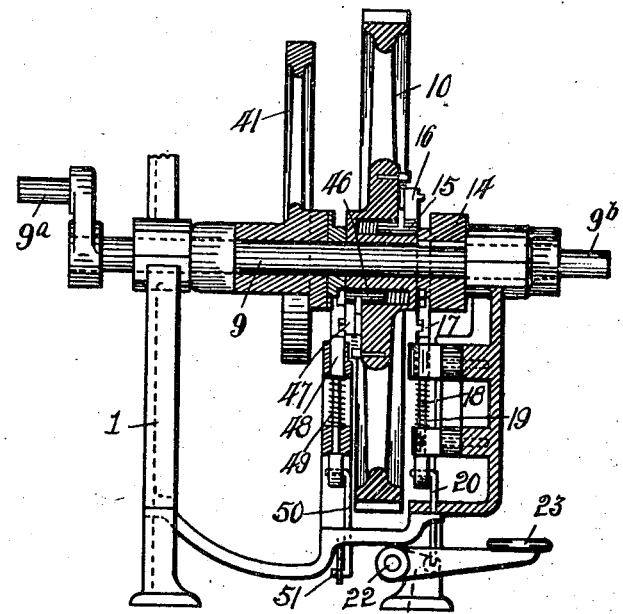

Fig. 1 is a side elevation of a machine embodying the invention, with the parts in at-rest mold-filling position. Fig. 2 is a top view thereof with the tamping mechanism removed. Fig. 3 is a fragmentary side elevation of the machine with parts broken away and in section, illustrating the block ejecting mechanism. Figs. 4 and 5 are side and end views of the crank shaft with which the tamping mechanism is connected. Fig. 6 is a vertical section centrally through the rear drive crank shaft, with parts in full and parts removed. Fig. 7 is a plan of the pallet or off-bearing plate, and Fig. 8 is a face view of the block separating board.

Referring to the drawings, 1 designates the machine frame, which is provided on the top thereof on one end with a mold-box 2 having a bottom frame 3 movable vertically therethrough and adapted to removably support a pallet or off-bearing plate 4. The bottom frame 3 comprises two laterally spaced members 5 extending lengthwise of the machine, and two cross-bars 6, which latter are supported by the members 5 and extend crosswise of the machine. The pallet 4 rests on the cross-bars 6 and is of a size to movably fit in the box. The bottom frame 3 is supported and has block ejecting and return movements imparted thereto by mechanism hereinafter described.

The box 2 is adapted to mold two blocks at a time and is therefore provided with a center block separating board 7 which is adapted to loosely rest on the bottom frame bars 6 between a pair of pallets 4. The customary cores 8 are provided in each compartment of the mold box and extend down loosely through registering openings in the pallet 4 and through the frame 3 and are fixed at their lower ends to a respective stationary cross bar $8^a$, which is bolted to the lower edges of the box sides and extends lengthwise of the machine under the frame bars 6.

A crank-shaft 9 is journaled crosswise of the frame 1 in the opposite end portion thereof to the mold box, and carries a large gear 10 loose thereon, which gear is in mesh with and driven by a pinion 11 on a cross-shaft 12 suitably journaled in the frame and carrying a belt pulley 13 to adapt it to be belted to any suitable source of power. A clutch-collar 14 is keyed to the shaft 9 at one end of the gear wheel hub and is adapted to be engaged by a clutch-pin 15 carried by the hub of the gear wheel 10 when such pin is released for such purpose by an outward radial movement of an associated trip-block 16. A trip 17 is carried by a trip-rod 18 and adapted, when depressed against the tension of the spring 19, to effect a tripping of the trip-block 16 and permit the pin 15 to engage the clutch-collar 14. This clutch mechanism is of the well known pin clutch type, and need not, therefore, be specifically described. The trip-rod 19 is connected by a link 20 to an arm 21 projecting laterally from a trip-shaft 22, which is mounted in the base portion of the frame lengthwise thereof, and carries a foot pedal 23 at the molding end of the machine in convenient reach of the operator.

The crank-shaft 9 has cranks $9^a$ and $9^b$ at opposite ends thereof, set at a right angle to each other, and the crank $9^a$ is connected by a connecting bar 24 to a crank $25^a$ on the adjacent end of a crank-shaft 25, which is journaled crosswise of the machine frame beneath the mold-box 2. The opposite end of the shaft 25 is journaled in a bracket-arm 26 projecting from the opposite side of the machine frame, and is provided between said bracket arm and the adjacent side of the machine frame with a crank 25$^b$ and a crank 25$^c$, the crank 25$^c$ being the same length and projecting in the same direction from the shaft as the crank 25$^a$, and the crank 25$^b$ being disposed at a right-angle to the two other cranks. The crank 25$^b$ is connected by a connecting bar 27 to the crank 9$^b$ of the shaft 9. The shaft 25 is driven from the shaft 9, and the purpose of relatively offsetting the cranks 9$^a$ and 9$^b$ and the cranks 25$^a$ and 25$^b$ is to prevent any dead center position occurring during a driving of one shaft by the other. The connection between the two shafts is such that a complete revolution of one will impart a complete revolution to the other.

The tamping means, which is driven by the shaft 25, comprises a yoke 28 of inverted U-form, which is adapted to straddle the mold box with its legs at the ends thereof, and each is connected by a link 29 to the respective cranks 25$^a$ and 25$^c$ of the shaft 25. The links 29 in the present instance instead of being connected directly to the legs of the yoke, are connected to rods 30, which are mounted for longitudinal movements in the yoke legs and have cushion springs 31 disposed between their upper ends and a yoke shoulder. The yoke 28, when in inoperative position, is adapted to lie in reclining position at one side of the mold-box, as shown in Fig. 1, and, upon a turning of the crank 25 from its at-rest position, in which position the cranks 25$^a$ and 25$^c$ are upstanding, the yoke is swung upward into register with the mold-box, and then lowered to effect a tamping of material in the box. This occurs during the down stroke of the cranks 25$^a$ and 25$^c$, and upon the up stroke of such cranks the tamping yoke is raised and then swung forward to its reclining position. Each leg of the yoke is provided at its lower free end with a pair of laterally spaced rollers 32, which engage opposite sides of an inverted L-shaped guide 33, one of which is secured to each side of the frame 1 below the respective side of the mold-box. The yoke, during its swinging movements, is supported and guided by a roller 34 carried by each leg thereof, resting and traveling on a curved track 35 provided on each side of the mold-box, and when the yoke has moved to vertical position in tamping register with the mold-box, the rollers strike stop plates 36 and stand in register with a vertical space 37 between the inner ends of the track bars 35 and stops 36 to permit a lowering of the yoke. It is evident that the bars 30 extend down beyond the fulcrum or turning axis of the yoke so that a downward pull exerted on the outer ends of said bars when the yoke is in reclining position, will tilt the yoke upward to vertical position, the tilting movement being guided by the coaction of the rollers 32 with the guide 33, and of the rollers 34 with the guide tracks 35. The yoke 28 carries a tamping plate 38 at its upper end portion for tamping coaction with material in the mold box when the yoke is lowered.

The bottom frame 3 of the mold box has Y supports 39 extending down from its cross bars 5 and resting at their lower ends on the peripheries of cams 40 carried by the shaft 25. These cams are so fashioned as to effect a slight gradual raising of the bottom frame 3 during a down tamping stroke of the yoke 28 so that a compressing action will be imparted both to the top and bottom surfaces of material disposed in the mold box.

The block ejecting means comprises a cam-wheel 41 loosely mounted on the shaft 9 and adapted to be clutch connected to the gear wheel 10 to turn therewith, and acts on one end of a lever 42 to impart vertical rocking movements thereto. This lever is fulcrumed on a cross shaft 43 of the frame and has its forward end forked and connected by separate links 44 to each cross member 5 of the mold-box bottom frame 3. It is thus evident that a lowering of the cam-wheel coacting end of the lever 42 will effect a raising of the bottom frame 3 to raise molded blocks carried thereby to discharging position above the mold box. The lever 42 has a roller 45 in coaction with the periphery of the cam-wheel 41, and the form of the wheel is such that substantially a quarter turn thereof from the rest position shown in Fig. 3 will impart a complete ejecting stroke to the lever 42.

The gear wheel 10 has a clutch pin 46 adapted, when released, to move into clutch engagement with the hub end of the cam wheel 41, in the ordinary manner of a pin clutch. The pin 46 is normally held in released position by a trip block 47 and this is released by the depression of a trip 48 in a manner well understood in the art. The trip 48 is normally held out of tripping engagement with the trip block by a spring 49. The lower end of the trip 48 is connected by a link 50 to a lever 51 which extends lengthwise of the machine, being fulcrumed at one end to the machine frame and having its other end carrying an upstanding rocker arm 52 with a trip-finger 53 at its upper end. The upper end portion of the arm 52 is connected by a link 54 to a vertically disposed lever 55 that is fulcrumed to a bracket 56 on the frame and has a roll 57 at its free end for engagement with and riding on the periphery of the cam-wheel 41. A spring 58 acts on the rocker arm 52 to normally hold its trip-finger 53 in position to be engaged and depressed by a part of the tamping-yoke 28 when disposed in its reclining position as shown in Fig. 1, so that the tamping yoke when lowered to such position depresses the rocker-arm 52 and lever 51 and imparts a tripping movement to the trip 48 to permit an engagement of the clutch pin 46 with the coacting clutch portion of the cam wheel 41. When the cam-wheel 41 is turned from its at-rest position, the roller 57 is moved outward from the registering entrant cam portion thereof, thereby rocking the lever 55 and effecting a withdrawal of the rocker arm 52 and trip finger 53 from engagement with the tamping-yoke so that a turning of the cam-wheel 41 will be stopped at the end of a complete revolution.

In the operation of the machine it will be understood that when the parts thereof are at rest the tamping-yoke 28 will stand in its reclining position as shown in Fig. 1 and the bottom frame 3 of the mold box and operating parts therefore will stand in the full line position shown in Fig. 3 so that the mold box is in condition for filling. A desired quantity of material having been deposited in the mold box in any suitable manner, the operator depresses the trip-pedal 23, which releases the clutch pin 15 and causes a single revolution to be imparted to the crank shaft 9, which in turn imparts a single revolution to the crank shaft 25. During the first half of a revolution of the crank-shaft 25 the tamping-yoke 28 is swung upward into vertical register with the mold box and then drawn downward into tamping relation to the material in the box, and during the second half of the revolution of the crank shaft the tamping-yoke is raised and then swung to its reclining position. The swinging movement of the tamping-yoke is guided by the circular tracks 35 and angled guide bar 33 in engagement respectively with the rolls 34 and 32. The yoke is stopped in its upright position by engagement of the rolls 34 with the stop plates 36 and is then permitted to have vertical movement. During the tamping stroke of the yoke 28 the cams 40 carried by the shaft 25 act on the members 39 to effect a slight raising of the bottom frame 3 of the mold box and pallets 4 to effect a compression of the bottom portion of the material in the box. When the tamping yoke 28 swings forward after a tamping operation, a part thereof will strike the trip finger 53 and effect a depression of the arm 52, lever 51 and trip 48 to release the clutch pin 46 on the continuously driven gear wheel 10 and permit its engagement with the cam wheel 41. The cam wheel is then given a complete revolution which causes the ejecting lever in engagement therewith, to be rocked and effect a raising of the frame 4 and molding blocks to discharging position at the top of the mold box, the bottom frame being held in elevated position during the time that the cam wheel is making more than half a revolution, which period is ample to permit a removal of the molded blocks and pallets on which they rest from the frame 3. As the cam wheel 41 starts its revolution it acts on the lever 55 to effect a retraction of the arm 52 and trip finger 53 from engagement with the tamping yoke so that the associated clutch is released at the end of a revolution.

The raising of the molded blocks above the top of the mold box enables the blocks to be drawn away from the center board 7 laterally thereof in a horizontal plane so that if the center board is fashioned to mold an imitation rock face on the blocks, such face will not be injured by the removal process.

Having thus described my invention, what I claim as new and desire to secure by Letters Patent, is:—

1. In a machine of the class described, a mold box, a tamping yoke straddling the box and capable of swinging and vertical movements relative thereto, means operable by continued movements thereof in the same direction to successively swing the yoke from inoperative to operative position with respect to the box, then impart a lowering tamping movement thereto, and then raise the yoke and swing it to inoperative position, and means cooperating with the leg portions of the yoke to guide the swinging and vertical movements thereof.

2. In an apparatus of the class described, a mold box, a crank shaft, means operable to rotate the crank shaft in one direction only, a tamping yoke straddling the box and movable with respect to the box, means connecting the yoke and crank and operable by a rotation of the crank to swing the yoke from inoperative to operative relation to the box, then impart a lowering tamping movement thereto, and then raise the yoke and return it to normal tilted position, and means cooperating with the yoke to guide its movement.

3. In an apparatus of the class described, a mold box, a tamping yoke straddling the box and mounted for swinging and vertical movements relative thereto, means guiding the movements of the yoke, and means including a crank shaft rotatable in one direction only and connected to the yoke, said last means being operable at each revolution of the crank shaft to swing the yoke to a position over the box, then lower and raise it with respect to the box, and then swing it back to its former position 4. In an apparatus of the class described, a mold box, a tamping yoke mounted for movements relative thereto, a crank shaft, yielding connection between the crank shaft and legs of the tamping yoke to successively swing the yoke over the box from inoperative position at the side thereof, then lower and raise it with respect to the box, and swing it from over the box to inoperative position, means for rotating the crank shaft, and means guiding the movements of the yoke.

5. In an apparatus of the class described, a frame, a mold box carried thereby, a tamping yoke straddling the box for swinging and vertical movements relative thereto, a pair of laterally spaced rolls carried by the terminal portion of each yoke leg, and a guide roll carried by each yoke leg above the pair of rolls, a curved L-shaped guide disposed between the pair of rolls for coaction therewith, a curved guide on which each guide roll travels during a swinging of the yoke, and which has a stop and an opening for guiding the vertical movements of the roll, and means connected to the leg portions of the yoke and operable to successively swing the yoke over the mold box from inoperative position at one side thereof, then lower and raise the yoke, and then swing it back to original position.

6. In a machine of the class described, a mold box, a movable bottom member for the box, a tamping yoke mounted for swinging and vertical movements relative to the box, and means operable to impart a slight upward block tamping movement to the bottom member and simultaneously therewith to swing the tamping yoke to a position over the box, and then lower and raise it and return it to original position.

7. In a machine of the class described, a mold box, a movable bottom closure member for the box, a tamping yoke mounted for swinging and vertical movements relative to the box, a crank shaft, means operable to impart a single revolution to the shaft, and then to stop the same, connection between the crank shaft and yoke operable to swing the yoke to operative tamping position over the box from inoperative position at one side thereof, and then lower and raise the yoke and swing it back to inoperative position, and means operable to impart a predetermined tamping movement to the bottom member during a tamping stroke of the yoke and its movement from inoperative to operative positions.

8. In an apparatus of the class described, a mold box having a vertically movable bottom, a continuously operating drive means, means in normally released clutch connection with the drive means and operable by the latter when in clutch connection therewith to effect a tamping of material in the box, said tamping means having a tamping member which is automatically movable into and out of tamping relation to the box, means operable to raise the box bottom and then to lower the same, and normally released clutch means between the drive means and box bottom moving means automatically operable by and when the tamping means is at a predetermined point in its movement to effect an operation of the bottom moving means.

9. In an apparatus of the class described, a mold box having a vertically movable bottom, a continuously operating drive means, a tamping means operable by connection with the drive means to tamp material in the box, manually controlled normally released clutch means between the drive and tamping means automatically operable to release the tamping means at a predetermined point in its movement, a cam wheel, connection between said cam wheel and box bottom for imparting vertical ejecting and retracting movements to the bottom when the wheel is rotated, a normally released clutch connection between the wheel and drive means, and means operable by the tamping means during the last portion of its movement to release the cam wheel connecting clutch to permit a single revolution of the cam wheel.

10. In an apparatus of the class described, a mold box having a vertically movable bottom, a continuously operative drive means, a tamping means operable by the drive means to tamp material in the box, means for controlling the driving connection between the drive and tamping means, a cam wheel, connection between the cam wheel and box bottom for reciprocating the bottom when the wheel is rotated, normally released clutch connection between the wheel and drive means, control means for the wheel clutch connection having a member normally standing in the path of movement of a part of the tamping means, whereby the part, when at a predetermined point in its movement, operates the clutch control to permit a clutch engagement of the drive means and wheel, and means operable by the cam wheel to move the clutch control out of position to be tripped by the tamping means when the cam wheel is turned from at-rest position.

11. In an apparatus of the class described, a mold box having a vertically movable bottom, a center board supported by the bottom and dividing the box into two compartments, the center board having a face for forming irregular surfaces on a side of a block molded by the box, and means operable to raise the bottom and center board together above the box to permit the lateral removal of a formed block from the center board.

In testimony whereof I have hereunto signed my name to this specification.

NOBLE W. HARTMAN.